United States Patent [19]

Stalder

[11] Patent Number: 4,665,755
[45] Date of Patent: May 19, 1987

[54] DEVICE FOR MONITORING THE SPRING FORCE EXERTED BY SPRING ACTUATED BAR COUPLED CABLE CLAMPS FOR CHAIR LIFTS AND CABLE CARS

[75] Inventor: Dieter A. Stalder, Ruti, Switzerland

[73] Assignee: Stadeli Lift AG, Switzerland

[21] Appl. No.: 809,429

[22] Filed: Dec. 16, 1985

[51] Int. Cl.[4] .................. G01L 5/00; B61B 12/12
[52] U.S. Cl. .................. 73/862.01; 73/862.53; 104/209
[58] Field of Search ............... 73/161, 862.01, 862.53, 73/862.54, 862.57; 116/212, DIG. 34; 340/665, 668; 294/75, 82.24, 82.25, 82.28; 248/64; 104/202, 204, 208, 209

[56] References Cited

U.S. PATENT DOCUMENTS 3,416,462 12/1968 Pomagalski .................. 104/202
3,605,491 9/1971 Senn .................. 73/862.54

FOREIGN PATENT DOCUMENTS 1933752 1/1970 Fed. Rep. of Germany ... 73/862.01

Primary Examiner—Charles A. Ruehl
Attorney, Agent, or Firm—Thomas W. Speckman; Ann W. Speckman

[57] ABSTRACT

A spring actuator having a multiplicity of plate springs whose force is to be monitored, is retained on a thrust cam where it is located between a thrust ring and a fixed collar. Between the collar and the spring stack are arranged two rotating and laterally movable disks between which balls are maintained integrally under load. Reference springs act upon the disks and as soon as the minimum clamping force is no longer exerted by the spring actuator, the reference springs are able to force the balls out of their supports, whereby a great deal of relative rotary movement occurs between the disks releasing a trip catch.

10 Claims, 4 Drawing Figures

DEVICE FOR MONITORING THE SPRING FORCE EXERTED BY SPRING ACTUATED BAR COUPLED CABLE CLAMPS FOR CHAIR LIFTS AND CABLE CARS

BACKGROUND OF THE INVENTION

1. Field of the Invention

The present invention relates to an apparatus for monitoring the spring force exerted by a spring actuated bar coupled to a cable clamp designed for chair lifts and cable cars, wherein reference springs representing the minimum clamping force act to displace the actuator spring whenever the spring force exerted by the spring actuator falls below the minimum clamping force to be monitored, thus releasing a trip latch, whereby the springs of the spring actuator are compressed on thrust ram (2) which bears at one end on clutch lever K and on the other end on cable clamp S.

2. Description of the Prior Art

The spring force exerted upon a clutching cable clamp must be precisely monitored for reasons of technical safety. Various means of achieving this are known. However, one can distinguish between two basic systems: those in which the force exerted by the cable clamp is monitored with the clamp released and those in which the force of the cable clamp is monitored with the clamp applied. The present invention is of the type in which the force exerted by the clamp is monitored while the clamp is applied.

One device for monitoring the spring force exerted by a spring actuator currently available on the market, operates with a number of reference springs which represent the preset force. As soon as the force exerted by the cable clamp actuator spring falls below the preset value, the mobile part of the cable clamp is displaced towards the fixed part of the clamp, thus releasing a trip catch.

One of the disadvantages of this existing apparatus is that monitoring of the force exerted by the actuator spring is performed by a multiplicity of symmetrically arranged springs which may themselves be subject to failure. A further disadvantage is that if a spring plate of one of the actuator springs should fail, the resulting displacement is minimal and would not always suffice to insure positive release of the trip latch.

SUMMARY OF THE INVENTION

An objective of the present invention is to provide an improved device wherein a displacement of relatively large amplitude is effected by the reference springs whenever the clamping force falls below the preset minimum level, so that absolutely positive release of the trip latch will be insured.

This objective is achieved in the present invention by providing a thrust ram with a collar which constitutes an indirect stop for excursion of one end of the spring actuator and the other end of the spring actuator bears on a thrust ring with the thrust ram affecting a clamping lever. Two disks are arranged between the collar and the spring actuator. The disks can rotate and move laterally with respect to one another and between the disks load bearing ball or roller bearings are maintained in recesses provided in both disks. Reference springs acting on both disks exert opposing forces so that as soon as the monitored spring force drops the reference springs rotate the disks in opposite directions and force the ball or roller bearings out of their recesses.

BRIEF DESCRIPTION OF THE DRAWINGS

A preferred embodiment of the present invention will be elucidated with the help of the following description and is shown in simplified form in the drawing wherein:

FIG. 4 shows a partial longitudinal cross-sectional view of the embodiment shown in FIG. 1 provided with roller bearings.

DESCRIPTION OF PREFERRED EMBODIMENTS

Figure 1:
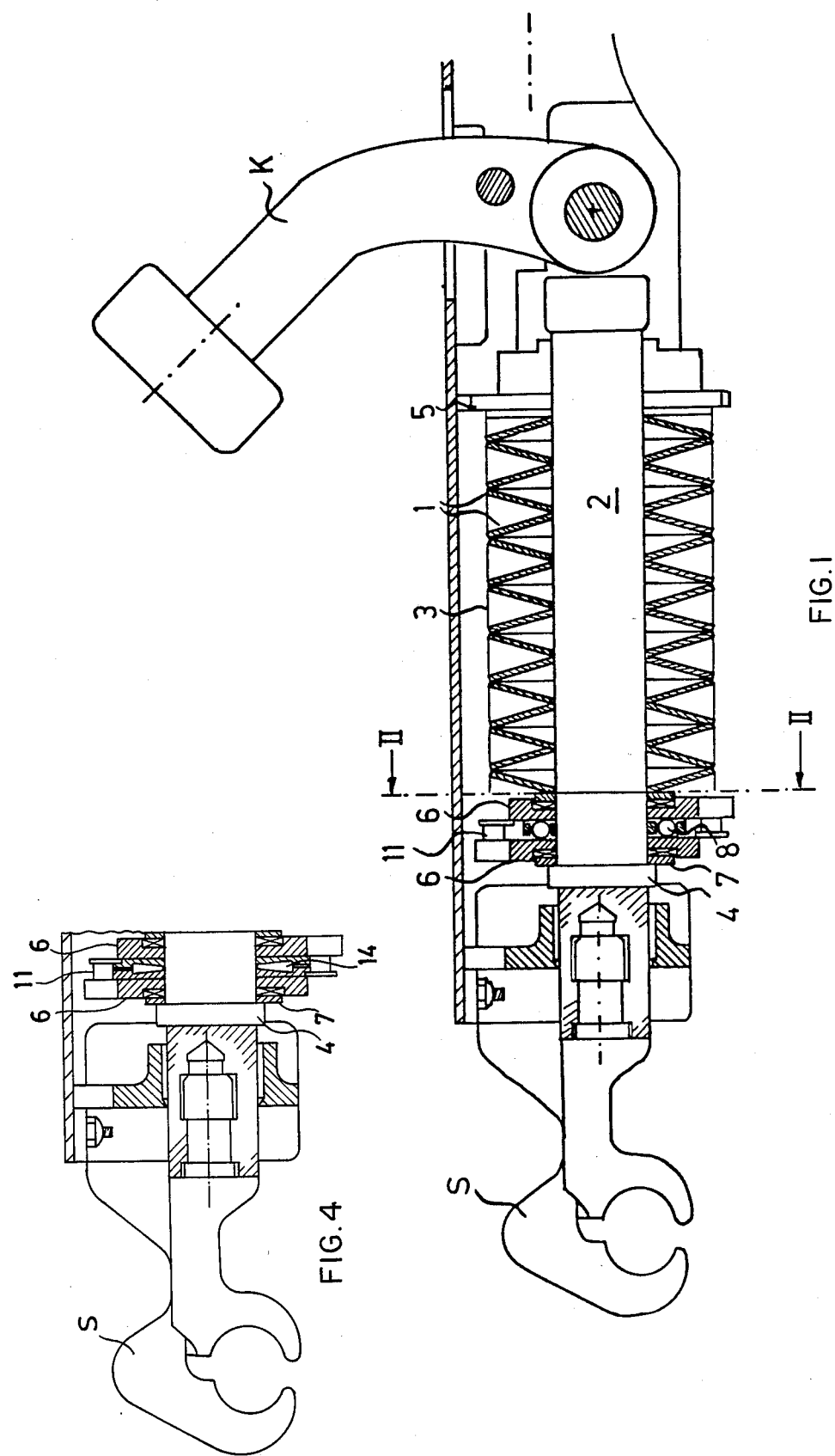
FIG. 1 shows a longitudinal cross-sectional view of the apparatus of one embodiment of the present invention.
Figure 2:
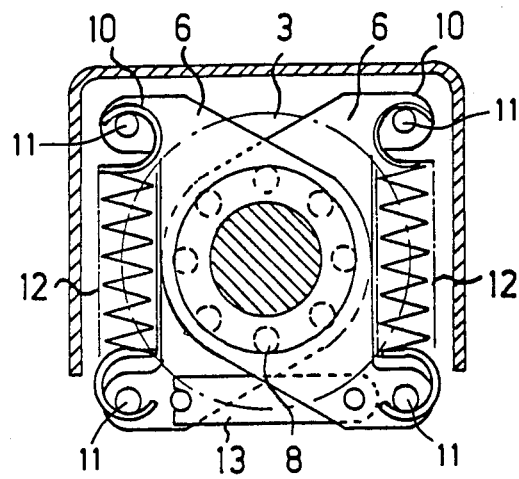
FIG. 2 shows a cross section of the apparatus at line II—II in FIG. 1.

In the illustrated embodiment, the spring force to be monitored is produced by a multiplicity of plate springs 1 which are arranged in a stack around thrust ram 2, thus serving as actuator spring 3. Actuator spring 3 is located between a collar 4, which is configured as part of thrust ram 2 and a thrust ring 5 which serves to limit movement of the actuator spring. To release the cable clamp, which is not illustrated in detail in the drawing, actuator spring 3 is compressed by clutch lever K acting upon thrust ring 5. Plate springs 1 are consequently compressed between collar 4 and thrust ring 5. The preloading of the actuator spring stack exceeds the preset minimum clamping force to be monitored.

For monitoring purposes disks 6 are located between actuator spring 3 and collar 4 which serves as a fixed limit stop, whereby the disks are located on the thrust ram 2 so as to be able to rotate and move axially along the thrust ram with respect to one another. The displacement of disks 6 is made possible by the presence of two thrust bearings 7 which may take the form of roller bearings, for example. The displacement of thrust ram 2 corresponds to the actuator spring travel.

Figure 3:
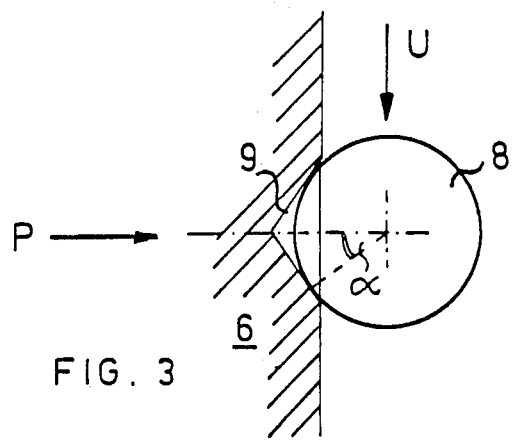
FIG. 3 is an enlarged view showing a ball in a recess of a disk in the apparatus of FIG. 1.

Ball or roller bearings 8 are located between disks 6. For this purpose, disks 6 are provided with recesses 9 (see FIG. 3) which act as bearing supports. Disks 6 are provided with radially projecting mountings 10 on which headed bolts 11 are fitted. Tension springs 12 are fastened to the bolts whose heads serve to prevent the springs from slipping off. Trip catch 13 is maintained between the two disks and is allowed to pivot about its support on one of them.

As long as the force exerted by the actuator spring exceeds the minimum preset force of the cable clamp which is being monitored, the reference tension springs or spring, if only one is being employed, are unable to force the balls 8 out of their recesses, shown as countersunk bores in the drawing, and the trip catch will consequently not be released. If the rotary force exerted by the springs is U, then: $P \geq U/\tan \alpha$.

If one of the plate springs fails, P falls to a value where $P > U/\tan \alpha$ applies. Consequently, under the effect of the force exerted by tension springs 12, the two disks are displaced with respect to one another, whereby the balls 8 are forced out of their recesses 9 and suddenly $U/\tan \alpha$ becomes greater than P and disks 6 will immediately rotate with respect to one another and the trip catch will be released from its detent.

Rollers 14 as shown in FIG. 1 can of course be used instead of the balls 8, and recesses of suitable shape may be provided.

Further variants are described in the claims.

I claim:

1. A spring actuated clamp device for controlling the spring force exerted by an actuator spring on a cable clamp, wherein tension springs representing a minimum clamping force act to displace said actuator spring whenever a force exerted by said actuator spring falls below said minimum clamping force, thus releasing a trip latch controlling said cable clamp, said spring actuated clamp device comprising a thrust ram (2) connected to a clutch lever at a first end and a cable clamp at a second end and having springs comprising said actuator spring arranged thereon; said thrust ram (2) provided with a collar (4) providing an indirect stop for movement of said actuator spring (3) at said second end, and a thrust ring (5) providing a stop for movement of said actuator spring (13) at said first end; two rotatable disks (6) mounted on said thrust ram (2) and arranged between said collar (4) and said actuator spring (3), said disks (6) axially displaceable with respect to one another and provided with recesses (9) accommodating load bearing means (8); at least one reference tension spring (12) mounted on each said disk (6) and exerting opposing forces, whereby as the force exerted by said actuator spring drops, said at least one reference spring rotates said disks (6) in opposite directions forcing load bearing means (8) out of their recesses (9) and axially displacing said disks (6) with respect to one another.

2. A device according to claim 1, wherein said bearing means are ball bearings.

3. A device according to claim 2, wherein two said tension springs (12) are mounted on radially projecting mountings (10) provided diametrically opposite one another on each said disk (6), said springs (12) attached at one end to one said disk and at the other end to the other said disk.

4. A device according to claim 3, wherein a thrust bearing (7) is provided between said collar (4) and one of said disks (6), and a thrust bearing (7) is provided between said actuator spring (3) and one of said disks (6).

5. A device according to claim 1, wherein said bearing means are roller bearings.

6. A device according to claim 5, wherein two said tension springs (12) are mounted on radially projecting mountings (10) provided diametrically opposite one another on each said disk (6), said springs (12) attached at one end to one said disk and at the other end to the other said disk.

7. A device according to claim 1, wherein two said tension springs (12) are mounted on radially projecting mountings (10) provided diametrically opposite one another on each said disk (6), said springs (12) attached at one end to one said disk and at the other end to the other said disk.

8. A device according to claim 7, wherein a thrust bearing (7) is provided between said collar (4) and one of said disks (6), and a thrust bearing (7) is provided between said actuator spring (3) and one of said disks (6).

9. A device according to claim 1, wherein a thrust bearing (7) is provided between said collar (4) and one of said disks (6).

10. A device according to claim 9, wherein a thrust bearing (7) is provided between said actuator spring (3) and one of said disks (6).

* * * * *